United States Patent
Abela

(10) Patent No.: US 9,973,372 B2
(45) Date of Patent: May 15, 2018

(54) METHOD AND DEVICE FOR EXTRACTING DATA FROM A DATA STREAM TRAVELLING AROUND AN IP NETWORK

(75) Inventor: Jerome Abela, Colombes (FR)

(73) Assignee: Qosmos Tech, Paris (FR)

( * ) Notice: Subject to any disclaimer, the term of this patent is extended or adjusted under 35 U.S.C. 154(b) by 898 days.

(21) Appl. No.: 14/006,978

(22) PCT Filed: Mar. 21, 2012

(86) PCT No.: PCT/FR2012/050585
§ 371 (c)(1),
(2), (4) Date: Sep. 24, 2013

(87) PCT Pub. No.: WO2012/131229
PCT Pub. Date: Oct. 4, 2012

(65) Prior Publication Data
US 2014/0019636 A1  Jan. 16, 2014

(30) Foreign Application Priority Data
Mar. 25, 2011  (FR) ...................... 11 52475

(51) Int. Cl.
| | | |
|---|---|---|
| *H04L 29/08* | (2006.01) | |
| *H04L 12/26* | (2006.01) | |
| *G06F 9/44* | (2018.01) | |

(52) U.S. Cl.
CPC ...... *H04L 29/08081* (2013.01); *H04L 43/022* (2013.01); *H04L 43/028* (2013.01);
(Continued)

(58) Field of Classification Search
CPC . H04L 67/32; H04L 65/1063; H04L 65/1016; H04L 29/08081; H04L 67/2842;
(Continued)

(56) References Cited

U.S. PATENT DOCUMENTS 6,952,756 B1 * 10/2005 Le ..................... G06F 9/383
365/149
7,305,391 B2 * 12/2007 Wyschogrod ..... G06F 17/30985
(Continued)

FOREIGN PATENT DOCUMENTS

| | | | |
|---|---|---|---|
| CN | 101 282 362 | | 10/2008 |
| CN | 101282362 B | * | 4/2011 |

OTHER PUBLICATIONS

Huang, Y., et al., "Fast Algorithms for Multi-Stream Content Detection", Electronic Commerce and Security, 2009, ISECS '09, Second International Symposium On, IEEE, Piscataway, NJ, USE, pp. 34-38.
(Continued)

*Primary Examiner* — Patrice L Winder
(74) *Attorney, Agent, or Firm* — Frost Brown Todd LLC

(57) ABSTRACT

In a phase of configuration, a state machine is constructed with states and transitions configured according to at least one type of data to be extracted from a data stream travelling around an IP network. The transitions between states are activated by conditions defined as a function of rules of organization of the data of the stream according to an application layer protocol. One or more states are moreover selected for the extraction of data from the stream. Thereafter, in a phase of real-time analysis of the stream, the stream data arising from IP packets travelling successively around the network are observed. When the state machine is in a current state, a search is conducted as to whether a condition of activation of a transition to a target state is realized by the data observed from the stream, and when such an activation condition is realized, the state machine is toggled into the target state. The data from the stream are extracted when the state machine is in a state selected in the configuration phase.

8 Claims, 2 Drawing Sheets

(52) U.S. Cl.
CPC .............. *H04L 43/18* (2013.01); *H04L 67/22* (2013.01); *H04L 67/2819* (2013.01); *H04L 67/2842* (2013.01); *G06F 9/444* (2013.01)

(58) Field of Classification Search
CPC ... H04L 67/2819; H04L 67/22; H04L 43/028; H04L 43/022; H04L 43/18; H04W 8/08; G06F 9/444
See application file for complete search history.

(56) References Cited

U.S. PATENT DOCUMENTS

| | | | |
|---|---|---|---|
| 7,586,851 B2 | 9/2009 | Panigrahy et al. | |
| 7,600,257 B2* | 10/2009 | Dubrovsky | H04L 47/34 726/23 |
| 7,899,978 B2* | 3/2011 | Pandya | G06F 9/444 711/103 |
| 8,347,384 B1* | 1/2013 | Preston | H04L 67/1097 726/23 |
| 8,473,523 B2* | 6/2013 | Goyal | G06F 17/30985 707/798 |
| 8,578,024 B1* | 11/2013 | Keralapura | H04L 47/2475 709/224 |
| 8,867,395 B2* | 10/2014 | Abel | H04L 47/10 370/252 |
| 2003/0110208 A1* | 6/2003 | Wyschogrod | G06F 17/30985 709/202 |
| 2009/0049230 A1* | 2/2009 | Pandya | G06F 17/30985 711/101 |

OTHER PUBLICATIONS

International Search Report and Written Opinion dated Jul. 3, 2012 for Application No. PCT/FR2012/050585.
English Translation of the International Search Report and Written Opinion dated Jul. 3, 2012 for Application No. PCT/FR2012/050585.
International Preliminary Report on Patentability and Written Opinion dated Oct. 1, 2013 for Application No. PCT/FR2012/050585.
English Translation of the International Preliminary Report on Patentability and Written Opinion dated Oct. 1, 2013 for Application No. PCT/FR2012/050585.
Abstract and English Machine Translation of Chinese Patent No. CN 101 282 362.

* cited by examiner

METHOD AND DEVICE FOR EXTRACTING DATA FROM A DATA STREAM TRAVELLING AROUND AN IP NETWORK

The present invention relates to analysis techniques relating to a data stream flowing over telecommunication networks, in IP ("Internet Protocol") packets. More particularly, in this case it is sought to extract in real time data from one or more specified categories without having to deal with the enormous amount of data flowing over the network.

IP packet analysers such as that distributed under the name Wireshark carry out a global extraction from a stream of the content of the packets carrying data in order to then subject it to a complete analysis allowing each of the different elements constituting this content to be identified. This methodology is not well adapted to the real time observation of multiple streams because it requires the extraction in real time of all of a stream for its analysis. Moreover, in the case of a change in the protocol according to which the stream is constructed, it is necessary to modify the analyser, even if the change is minor or relates to aspects of the protocol which are not relevant to the information sought.

A need exists for a technique allowing efficient extraction and synchronic mapping of targeted information present in the data streams over IP type networks.

A method is proposed for extracting data from a data stream flowing over an IP network, the data of the stream being organised according to an application layer protocol (layer 7 of the OSI model). In this context and from the point of view of the application layer, the stream is segmented in a virtually random manner by the processes of the network (IP) layer and/or transport (TCP, UDP, etc.) layer. Nevertheless it is desirable, given that the traffic flows at a very high bit rate over the IP network, to have the capability to extract specific data contained in the stream for processing. The method comprises:
- a configuration phase in which a state machine is constructed with states and transitions configured according to at least one type of data to be extracted from the stream, the transitions between states being activated by the respective conditions defined as a function of rules for organization of the data of the stream according to the application layer protocol, and in which at least one state is selected for the extraction of data from the stream; and
- a real time analysis phase of the data stream.

The real time analysis phase comprises:
- observing the data of the stream originating from IP packets flowing successively over the network;
- when the state machine is in a current state, determining if an activation condition for a transition from the current state to a target state is fulfilled by the observed data of the stream and when this activation condition is fulfilled, changing the state machine to the target state;
- extracting the data from the stream when the state machine is in a state selected in the configuration phase for the extraction of data from the stream; and
- disregarding the data of the stream when the state machine is in a state not selected in the configuration phase.

The state machine, the nodes of which describe the relevant structural elements of the grammar of the protocol, makes it possible to extract the useful semantic and subsumption information when they appear in the stream. The state machine is composed of states and transitions. The transitions make it possible to move from one state to another and are typically activated by lexemes during observation of the data stream.

The state machine used operates on data streams which can have a very variable content (textual or binary), the syntax of which is not necessarily perfectly known, which are likely to contain errors and which are not available in their entirety at each moment in time.

In order to do this, without having to extract all of the stream, the method searches for the conditions allowing the activation of the different transitions by analysing the data of the stream in real time. The transition activations and the data present between two states can be managed separately.

Moreover, the method allows management of the storage in buffer memory of only those portions of the stream necessary to the search for activation conditions of the transitions in the presence of fragmentation of the data. In such an embodiment, the activation conditions of transitions of the state machine comprise the presence of respective lexemes in the data of the stream, and the real time analysis phase of the data stream comprises, when the state machine is in a current state;
- storing in buffer memory at least N−1 characters situated at the end of the data of the stream observed in an IP packet, N being the largest number of characters of the lexemes corresponding to the transitions out of the current state; and
- on receiving next data of the stream originating from an IP packet flowing subsequently over the network, placing the content of the buffer memory in front of the data received in order to search for the possible presence of a lexeme split between the two packets.

The states of the state machine selected in the configuration phase can comprise one or more states in which the data extracted from the stream are directly transferred to an external processor.

The selected states of the state machine can also comprise one or more states in which the data extracted from the stream are stored in buffer memory then transferred to an external processor once the state machine leaves this selected state. The buffer memory receiving the data extracted from the stream in such a selected state of the state machine preferably has a size limited to a configurable number of characters.

Another aspect of the present invention relates to a device suitable for implementing the above method. This device comprises:
- a state machine having states and transitions configured according to at least one type of data to be extracted from the stream, the transitions between states being activated by the respective conditions defined as a function of rules for organization of the data of the stream according to the application layer protocol, at least one state of the state machine being selected for the extraction of data from the stream;
- an input for receiving in real time the data of the stream originating from IP packets flowing successively over the network;
- a detector of transitions for determining, when the state machine is in a current state, if an activation condition of a transition from the current state to a target state is fulfilled by the data of the stream received at the input and for changing the state machine to the target state when said activation condition is fulfilled. The data of the stream are extracted when the state machine is in a selected state for the extraction of data from the stream, and disregarded when the state machine is in an unselected state for the extraction of data from the stream.

Other features and advantages of the present invention will become apparent from the following description of a non-limitative embodiment, with reference to the attached drawings, in which.

Figure 1:
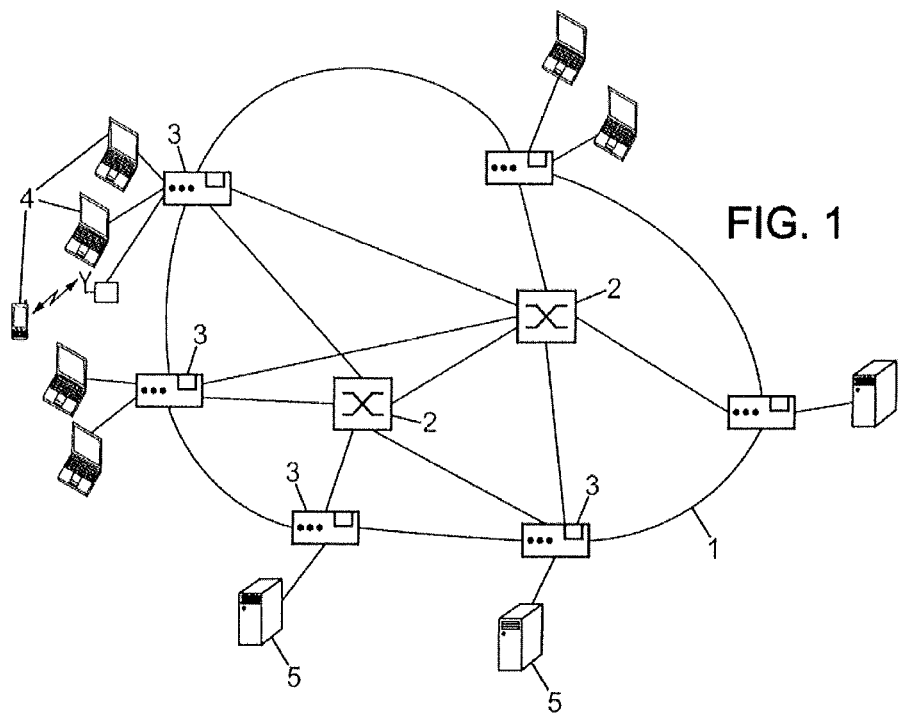
FIG. 1 is a simplified diagram of an IP network to which the invention can be applied.

With reference to FIG. 1, an IP network 1 such as the Internet comprises in a standard fashion different routing equipments, some (2) being internal to the network and others (3) being situated on the periphery for connecting various installations, such as user terminals 3, user computer installations 4, servers by which the network operators manage their subscribers, gateways to other networks, etc.

The links between the routers 2, 3 are carried out by very high bit-rate connections provided, for example, by optical fibre lines. Representative values of the bit rate are several tens of gigabits per second.

Within the different data streams that are carried by these high bit-rate links, certain applications require the extraction of specific data, for example for the purposes of billing, security, management of the quality of services, etc.

It is desirable that the devices receiving the data extracted in this way are not overwhelmed by the potentially immense quantities of data which flow over the IP network 1. To this end, equipment 10 can be used such as that represented diagrammatically in FIG. 2.

This equipment 10 is typically installed at the level of a router 2, 3 so as to interface with one of the high bit-rate links between these routers. However, it will be understood that the equipment 10 can also be installed on a link situated between an end router 3 and gateways or user installations.

Figure 2:
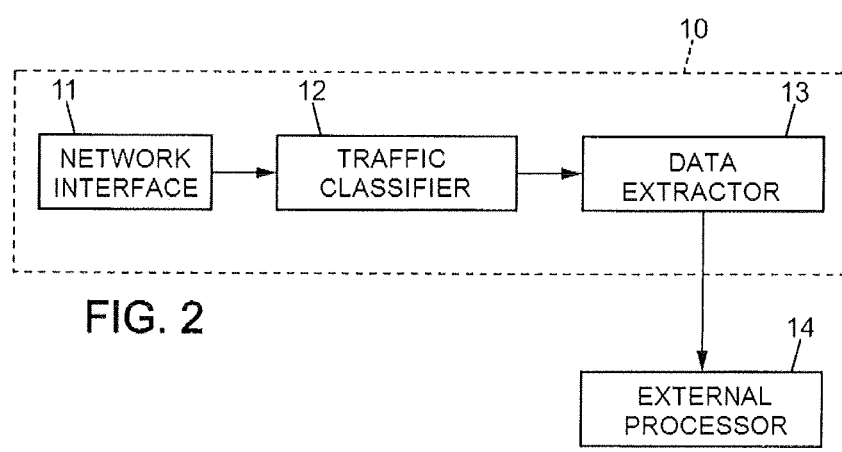
FIG. 2 is a block diagram of equipment which can be connected to the network of FIG. 1 for implementation of the invention.

The equipment 10 represented in FIG. 2 comprises a network interface 11 adapted to the physical layer and to the lower protocol layers of the link on which the equipment is mounted. The traffic seen by the network interface 11 is subjected to a classifier 12 capable of identifying the data stream to which the successive IP packets constituting this traffic belong. The classifier 12 implements a recognition and protocol analysis technique such as for example that described in WO 2004/017595 A2. Its architecture can optionally be distributed as described in WO 2006/120039 A1.

The traffic classifier 12 is configured to selectively present the IP packets which are taken from one or more data streams specified by the system administrator to a data extraction device 13. For each of these streams, the extractor 13 selects the relevant data as a function of a configuration performed by a user, extracts them from the stream and communicates them to an external processor 14 which carries out the required processing on the data extracted (for example processing for billing, for security or quality of service applications, etc.). The user to which reference is made in this case is that which manages the applications executed by the external processor 14. It is possible to combine this user with the system administrator specifying the data stream to be extracted. In another service-oriented architecture, the user can equally be separate from the system administrator if the latter offers the data extraction service to several people having different types of processing to carry out.

Figure 3:
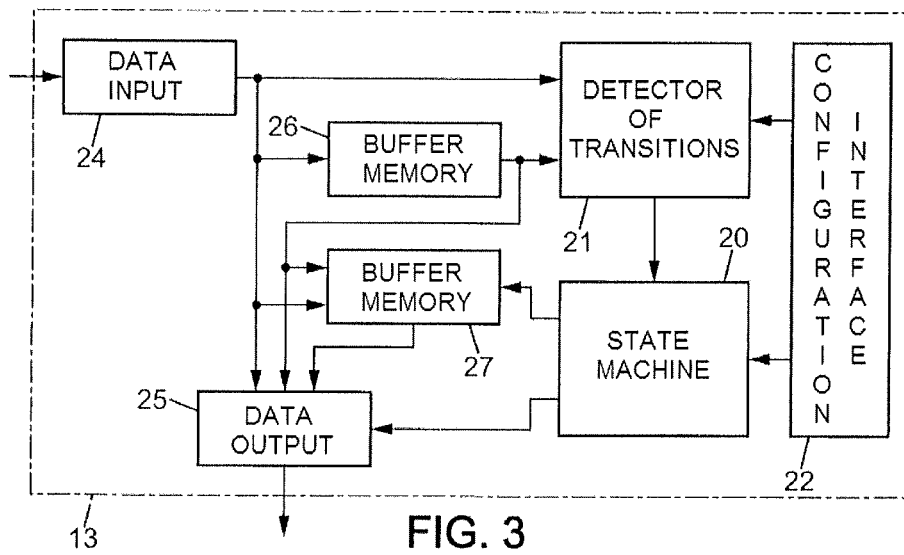
FIG. 3 is a block diagram of an example of a data extraction device according to the invention.

The data extractor 13 can have an architecture such as that illustrated by FIG. 3. This architecture is centred on a state machine 20 and a detector of transitions 21 that the user configures via an appropriate human/machine interface 22. In a configuration phase, the user defines via the interface 22 the states and the transitions of the state machine 20 as well as the activation conditions of the transitions between the states. The interface 22 can incorporate knowledge of the grammar of the protocol in order to assist the user in the configuration operation.

The data extractor 13 has an input 24 which receives in real time the data of the stream originating from IP packets, which are presented to it by the traffic classifier 12. The data extracted from this stream in accordance with the configuration carried out via the interface 22 are delivered to the external processor 14 by the data output 25.

The use of a state machine in the case of networks of IP type imposes operational constraints. In fact, the streams are then fragmented, each fragment originating from an IP packet being of variable size. This fragmentation can take place at any moment in the grammar of the protocol. The two following cases should be taken into account:

the data necessary for the activation of the condition of a transition can be split between the end of a packet and the start of the following packet;

the useful data to be processed in a state can be present over several packets whereas the user can request that they are not processed in a fragmented manner.

In order to take these two cases into account, the data extractor 13 comprises two buffer memories 26, 27 (in practice, these buffers 26, 27 can be produced inside a single memory plane).

The buffer memory 26 serves to manage situations where a lexeme sought by the detector of transitions 21 is found to be split between two IP packets successively received at the input 24. In a given state of the state machine 20, several lexemes can be sought for the possible activation of the transitions available out of this state. If N denotes the maximum number of characters of these lexemes, it is convenient to record in the buffer memory 26 the last N−1 characters of the data stream received in each IP packet received when the state machine is in this given state. On reception of the next IP packet containing data of the stream, the content of the buffer memory 26 is placed in front of the first character of the data received at the input 24 so that the detector of transitions 21 can observe the possible presence of one of the sought lexemes. This cooperation between the detector of transitions 21 and the buffer memory 26 ensures that the sought lexemes are not lost due to segmentation of the stream at the IP level. It will be noted that the buffer memory 26 can optionally contain slightly more than N−1 characters, its size must nevertheless remain considerably less than that of the data to be extracted.

The state machine 20 comprises a list of states established according to the structure of the grammar of the stream. Each state contains a list of transitions the activation conditions of which, sought by the detector of transitions 21, are typically the presence of lexemes received in the data stream. Each state is moreover associated with a procedure indicating the way in which to process the data which are received while the machine 20 is in this state.

Each transition of a state specifies an activation condition and the associated target state, as well as the minimum length of data that it is necessary to analyze in order to ensure the operation of the condition. The activation condition, specific to a state and to the transition on which it depends, can take one of the following forms:
- discovery of a given string of characters by using for example the Boyer-Moore search algorithm;
- discovery of a given string of characters by using a search tree (prefix tree or ordered tree data structure);
- progression in the stream of a given number of bytes;
- progression in the stream of a variable number of bytes which is a generalization of the previous case. In this case, the size of the hop is not indicated in the description of the state machine, but is given at the input of the state out of which the transition exists;
- a generic condition: in practice, the state machine is informed of this condition via a function capable of finding the transition, which makes a generalization thereof that encompasses all the preceding cases.

The conditions are generally activated following a progression in reading the data stream received at the input 24. When such a transition is activated, it is possible to exploit the data present before activation of the transition allowing transition to the next state. According to the configuration requested by the user, the data present between two changes of state can be:
- disregarded; or
- transmitted to a function linked with the first state for processing. This function is typically the immediate sending of the data via the output 25; or
- stored in the buffer memory 27 then transmitted to a function linked with the first state for processing. This function is typically the sending of the data via the output 25 at the moment when the state machine 20 leaves the current state. The buffer memory 27 can be configured so as to have a maximum size in terms of number of characters. The state machine 20 can be forced to leave the current state when this maximum number of characters has been saved in the buffer memory 27. This allows an overflow of this buffer memory to be avoided.

By way of illustration, the particular examples of the implementation of the invention are presented hereafter in the case of the instant messaging protocol known as Jabber or XMPP ("Extensible Messaging and Presence Protocol"), based on the XML language ("Extensible Markup Language"). These examples can be generalized without difficulty to other extensions of the Jabber/XMPP protocol or to other protocols.

For the sake of performance (memory and processing time of the analysis of the text) and of robustness, the grammar of the Jabber protocol is not described in full. Only those markers are considered which constitute the invariants around the information which it is desired to extract.

In Example 1, the user seeks to extract the content of the messages transmitted in the Jabber protocol.

In Example 2, the extraction relates to contacts (e-mail addresses) transmitted in the Jabber protocol.

Figure 4:
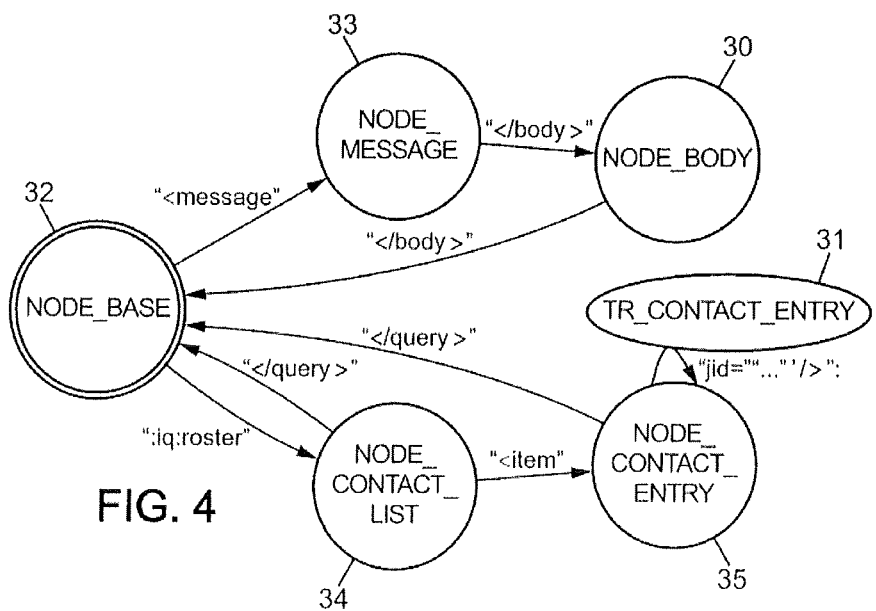
FIG. 4 is a diagram of a state machine which can be used in a specific case presented by way of illustration.

The state machine 20 can be constructed according to the diagram illustrated by FIG. 4 for implementing these embodiments. Two types of states are selected by the user in the state machine 20 for carrying out the extraction of the data. In the first type (state 30 called "NODE_BODY"), the content of the messages will never be memorized in the extraction device 13 as it can be very voluminous. In the second type (state 31 called "TR_CONTACT_ENTRY"), the e-mail addresses may be stored in buffer memory 27 in order to be transmitted in one go to the external processor 14.

In the two cases, during the callback procedure for the transfer of data in a selected state, the extractor 13 provides the processor 14 with the information on the current state (NODE_BODY or TR_CONTACT_ENTRY) as well as the data extracted, which gives the semantic and subsumption information necessary for the correct interpretation of the data.

From a node 32 called "NODE_BASE", the initial position of the state machine 20, a branch of the graph describing the state machine detects the start of the content of a message from the detection of the lexeme <message, while another branch searches for an item of information present only in the signalling data designated by the lexeme:iq: roster.

The states and transitions of the state machine 20 represented in FIG. 4 are defined in the following manner in the configuration phase:

{ node: NODE_BASE, nextnode: NODE_MESSAGE, start: " <message " },
{ node: NODE_BASE, nextnode: NODE_CONTACT_LIST, start: "::iq:roster" },
{ node: NODE_MESSAGE, nextnode: NODE_BODY, start: " <body> " },
{ node: NODE_BODY, nextnode: NODE_BASE, start: " </body> " },
{ node: NODE_CONTACT_LIST, nextnode: NODE_BASE, start: " </query> " },
{ node: NODE_CONTACT_LIST, nextnode: NODE_CONTACT_ENTRY, start: " <item " },
{ node: NODE_CONTACT_ENTRY, transnode: TR_CONTACT_ENTRY, start: " jid="", end: " '/> ", flag:SM_TRUNCATE },
{ node: NODE_CONTACT_ENTRY, nextnode: NODE_BASE, start: " </query> " }, where:
- "node" is the name of the current state;
- "nextnode" is the name of the next state when the transition condition is activated;
- "start" denotes the marker for searching in the stream in order to activate this transition.

In the case where a temporary state linked to the storage in buffer memory 27 is used by the state machine, there are two additional items of information:
- "transnode" (transitory node): name of the temporary state of the rapid transition;
- "end": marker sought in order to leave the rapid transition;
- "flag": optional marker. In the present case, it indicates truncation of the data if the end marker cannot be found when the buffer memory 27 is full.

EXAMPLE 1

After detection of the lexeme <message, the first branch brings the state machine 20 to the NODE_MESSAGE (33) state where no extraction has yet been carried out. The detection of the lexeme <body> in the NODE_MESSAGE state will then bring the machine 20 to the NODE_BODY state. In this state 30, the callback sends all the received data from the successive IP packets to the output 25, until the end marker </body> is detected which returns directly to the initial state 32.

That way, the data extractor 13 isolates any content of the messages of the stream included between the XML tags <body> and </body> defined in the protocol. As the content of the message can be voluminous, it does not pass through the buffer memory 27. It will be transmitted in one or more goes, on successive reception of the IP packets.

The application stream can for example be presented thus:

```
<message xmlns="jabber:client" type="chat"
to="cyberic99@gmail.com" id="aac3a">
<body>Bonjour Eric</body>
<active xmlns="http://jabber.org/protocol/chatstates"/>
<nick xmlns="http://jabber.org/protocol/nick">sir swiss</nick>
</message>
```

The extractor 13 will then provide the body of the message "Bonjour Eric" to the external processor 14.

It can occur that the start marker is segmented over two IP packets, for example:

```
A.  <message xmlns="jabber:client" type="chat"
    to="cyberic99@gmail.com" id="aac3a"><b
B.  ody>Bonjour Eric</body><active
    xmlns="http://jabber.org/protocol/chatstates"/><nick
    xmlns="http://jabber.org/protocol/nick">sir swiss</nick>
```

In the NODE_MESSAGE state where the state machine 20 is at the end packet A, the length of the longest lexeme (<body>=6 characters) activating a transition, less one character (1 byte), i.e. five characters, is stored in buffer memory 26. At the end packet A, the memory 26 then contains "a"><b". On reception of the packet B, the strings of characters "<b" and "ody>" are reassembled and the message is transmitted in one go as it is complete in packet 2. The remainder of the stream is disregarded by the extractor 13.

It can also occur that the content of the message is segmented over several IP packets, for example:

```
C.  <message xmlns="jabber:client" type="chat"
    to="cyberic99@gmail.com" id="aac3a"><body>Bonjour
D.  Eric</body><active
    xmlns="http://jabber.org/protocol/chatstates"/><nick
    xmlns="http://jabber.org/protocol/nick">sir swiss</nick></message>
```

In the NODE_BODY state where the state machine 20 is at the end of packet C, the length of the longest lexeme (</body>=7 characters) activating a transition, less one character, i.e. six characters, is stored in buffer memory 26. Only "B" is transmitted to the processor 14 on reception of this packet C, "onjour" being held in memory 26. On reception of the packet D, the end marker </body> is detected, which sends the data of the memory 26 and those of the new packet situated before the end marker to the output 25, i.e. in all: "onjour Eric". The processor 14 can then proceed with the reassembly of the strings "B" and "onjour Eric" successively received from the extractor 13.

It can also occur that the end marker </body> is segmented over two IP packets, for example:

```
E.  <message xmlns="jabber:client" type="chat"
    to="cyberic99@gmail.com" id="aac3a"><body>Bonjour Eric</bo
F.  dy><active xmlns="http://jabber.org/protocol/chatstates"/><nick
    xmlns="http://jabber.org/protocol/nick">sir swiss</nick></message>
```

In the state NODE_BODY where the state machine 20 is at the end of packet E, six characters are stored in buffer memory 26 at the end of each IP packet. At the end of packet E, the memory 26 then contains "ic</bo". Only "Bonjour Er" is transmitted to the processor 14 during the reception of this packet E. On reception of packet F, the end marker </body> is reassembled and detected, which sends to the output 25 the data of the memory 26 except those which belong with the marker detected, i.e.: "ic".

The method described here for two packets C, D or E, F is general for any splitting of the data stream. If several packets smaller than the size of the body of the message are received successively, they are transmitted as and when they are received except the six last characters retained in buffer memory 26 until reception of the following packet of the stream, in order to make it possible to search for the largest transition out of the current state 30.

EXAMPLE 2

After detection of the lexeme:iq:roster, the second branch of the graph of FIG. 4 brings the state machine 20 to the NODE_CONTACT_LIST state (34) where no extraction is yet carried out. If the lexeme </item is detected in the stream at the NODE_CONTACT_LIST state, the state machine 20 moves to the NODE_CONTACT_ENTRY state (35) where no extraction is carried out either. The detector of transitions 21 must then observe the lexeme jid=' in the stream in order to move to the TR_CONTACT_ENTRY state. In this state 31, the content of the stream received on the input 24 is written to the buffer memory 27 until the end marker '/> is detected which resends to the NODE_CONTACT_ENTRY state 35. If the lexeme </query is detected in the stream at the state 34 or 35 (NODE_CONTACT_LIST or NODE_CONTACT_ENTRY), the state machine 20 returns to the base state 32. The transition to the TR_CONTACT_ENTRY state is called a rapid transition, as the state machine 20 can only remain in this state 31 for the requirements of storing in buffer memory the content between the two start and end markers jid=' and '/>. When the end marker '/> has been detected, the state machine 20 returns to the state NODE_CONTACT_ENTRY. The detector of transitions 21 can thus continue to read the e-mail addresses of the contacts until the marker </query of the end of signalling is detected.

The data extractor 13 therefore searches in the XML token <item> for the content of the attribute jid, i.e. the text contained between jid=' and '/>. As the e-mail addresses are by nature relatively small, it can be requested that it is transmitted in one go, in the case where it is segmented over several packets. The state machine must optionally put the content into buffer memory 27 until reception of the end marker '/>.

The application stream can for example be presented thus:

```
<iq from='qosmojab@swissjabber.org/dev1' type='result' id='aab6a'>
<query xmlns='jabber:iq:roster'>
<item subscription='both' jid='qosmojab@im.apinc.org'/>
<item subscription='both' name='babydaisy'
jid='babydaisy@binaryfreedom.info'/>
<item subscription='to' jid='roiboo.crusher@gmail.com'/>
<item subscription='to' jid='cyberic99@gmail.com'/>
</query></iq>
```

When an e-mail address is not fragmented, the two start and end markers jid=' and '/> being present in the same packet of the stream, the extraction of the address and its transmission by the processor 14 are carried out in one go, without use of the buffer memory 27.

If the start marker jid=' is segmented between two IP packets, the procedure is the same as in Example 1, with recording in the buffer memory 26 of the length of the first transition less 1 byte. On reception of the second packet, the marker jid=' is reconstituted and the transition activated, in order to enter into the temporary TR_CONTACT_ENTRY state.

An e-mail address can be segmented between two IP packets, for example:

| | |
|---|---|
| G. | <iq from='qosmojab@swissjabber.org/dev1' type='result' id='aab6a'><query xmlns='jabber:iq:roster'><item subscription='both' jid='qosmojab@im |
| H. | .apinc.org'/><item subscription='both' name='babydaisy' jid='babydaisy@binaryfreedom.info'/><item subscription='to' jid='roiboo.crusher@gmail.com'/><item subscription='to' jid='cyberic99@gmail.com'/></query></iq> |

Once the transition of marker jid=' is activated, the state machine 20 enters the temporary TR_CONTACT_ENTRY state where the data are written to the buffer memory 27 until the end transition '/>. This buffer memory 27 is of a limited size, the maximum value of which is for example 50 bytes (configurable) plus the size of the end marker sought '/> (i.e. 53 bytes in total). In the packet G, the string of characters "qosmojab@im" is stored in memory. Then, in the packet H, the data are added to this memory 27 until the maximum size calculated previously is reached. When the end marker '/> is found, all of the data recorded in the memory 27 are transmitted to the output of 25, and the state machine 20 leaves the TR_CONTACT_ENTRY state in order to return to the state 35 NODE_CONTACT_ENTRY.

If the end marker is not found, there are two possibilities between which a choice is made during the configuration using the options of the transitions. The general case is to continue searching for the end marker '/>, by replacing the oldest stored data by those which are read in the stream. The data transmitted when the end marker is found are then the 50 bytes which precede it. Another possibility consists of truncating the data at the maximum size that can be stored, and activating the end transition in order to force the change of state (SM_TRUNCATE option).

The embodiments described above are illustrations of the present invention. Various modifications can be made to them without exceeding the scope of the invention which is apparent from the attached claims.

The invention claimed is:

1. Method for extracting data from a data stream flowing over an IP network, the data of the stream being organized according to an application layer protocol, the method comprising:
a configuration phase in which a state machine is constructed with states and transitions configured according to at least one type of data to be extracted from the stream, the transitions between states being activated by the respective conditions defined as a function of rules for organization of the data of the stream according to said application layer protocol, and in which at least one state is selected for the extraction of data from the stream, and in which the selected states of the state machine comprise a first state in which the data extracted from the stream are stored in buffer memory then transferred to an external processor once the state machine leaves said first state; and
a real time analysis phase of the data stream, comprising:
observing the data of the stream originating from IP packets flowing successively over the network;
when the state machine is in a current state, determining if an activation condition of a transition from the current state to a target state is fulfilled by the observed data of the stream and when this activation condition is fulfilled, changing the state machine to the target state;
extracting the data from the stream when the state machine is in the first state selected in the configuration phase for the extraction of data from the stream and storing the extracted data in buffer memory;
once the state machine leaves said first state, transmitting the data stored in buffer memory to the external processor for further processing and
disregarding the data of the stream when the state machine is in a state not selected state in the configuration phase.

2. Method according to claim 1, wherein activation conditions of the transitions of the state machine comprise the presence of respective lexemes in the data of the stream, and wherein the real time analysis phase of the data stream comprises moreover, when the state machine is in a current state:
storing in buffer memory at least N−1 characters situated at the end of the data of the stream observed in an IP packet, N being the largest number of characters of the lexemes corresponding to the transitions out of the current state; and
on receiving next data of the stream originating from an IP packet flowing subsequently over the network, placing the content of the buffer memory in front of the data received in order to search for the possible presence of a lexeme split between the two packets.

3. Method according to claim 1, wherein the selected states of the state machine comprise a state in which the data extracted from the stream are directly transferred to an external processor.

4. Method according to claim 1, wherein the buffer memory receives the data extracted from the stream in said selected state of the state machine has a size limited to a configurable number of characters.

5. Device for extracting data from a data stream flowing over an IP network, the data of the stream being organized according to an application layer protocol, the device comprising:
a state machine having states and transitions configured according to at least one type of data to be extracted from the stream, the transitions between states being activated by the respective conditions defined as a function of rules for organization of the data of the stream according to said application layer protocol, at least one state of the state machine being selected for the extraction of data from the stream and wherein the selected states of the state machine comprise a first state in which the data extracted from the stream are stored in buffer memory then transferred to an external processor once the state machine leaves said first state;
an input for receiving in real time the data of the stream originating from IP packets flowing successively over the network;
detector of transitions for determining, when the state machine is in a current state, if an activation condition of a transition from the current state to a target state is fulfilled by the data of the stream received at the input and for changing the state machine to the target state when said activation condition is fulfilled,
the data of the stream being extracted when the state machine is in the first state and the extracted data is stored in buffer memory, and disregarded when the state machine is in an unselected state for the extraction of data from the stream;

an output for transmitting the data extracted and stored in buffer memory to the external processor for further processing, once the state machine leaves the first state.

6. Device according to claim 5, wherein activation conditions of the transitions of the state machine comprise the presence of respective lexemes in the data of the stream, and wherein the detector of transitions is associated with a buffer memory controlled in order to receive, when the state machine is in a current state, at least N−1 characters situated at the end of the data of the stream observed in an IP packet, N being the largest number of characters of the lexemes corresponding to the transitions out of the current state, the detector of transitions being arranged in order to, on receiving the next data of the stream originating from an IP packet flowing subsequently over the network, search for the possible presence of a lexeme split between the two packets by putting the content of the buffer memory in front of the data received.

7. Device according to claim 5, wherein the selected states of the state machine comprise a state in which the data extracted from the stream are directly transferred to an external processor.

8. Device according to claim 7, wherein the buffer memory receiving the data extracted from the stream in said selected state of the state machine has a size limited to a configurable number of characters.

\* \* \* \* \*